May 26, 1931.    G. M. BARNES    1,806,884
CYLINDER AND PISTON
Filed Dec. 10, 1930
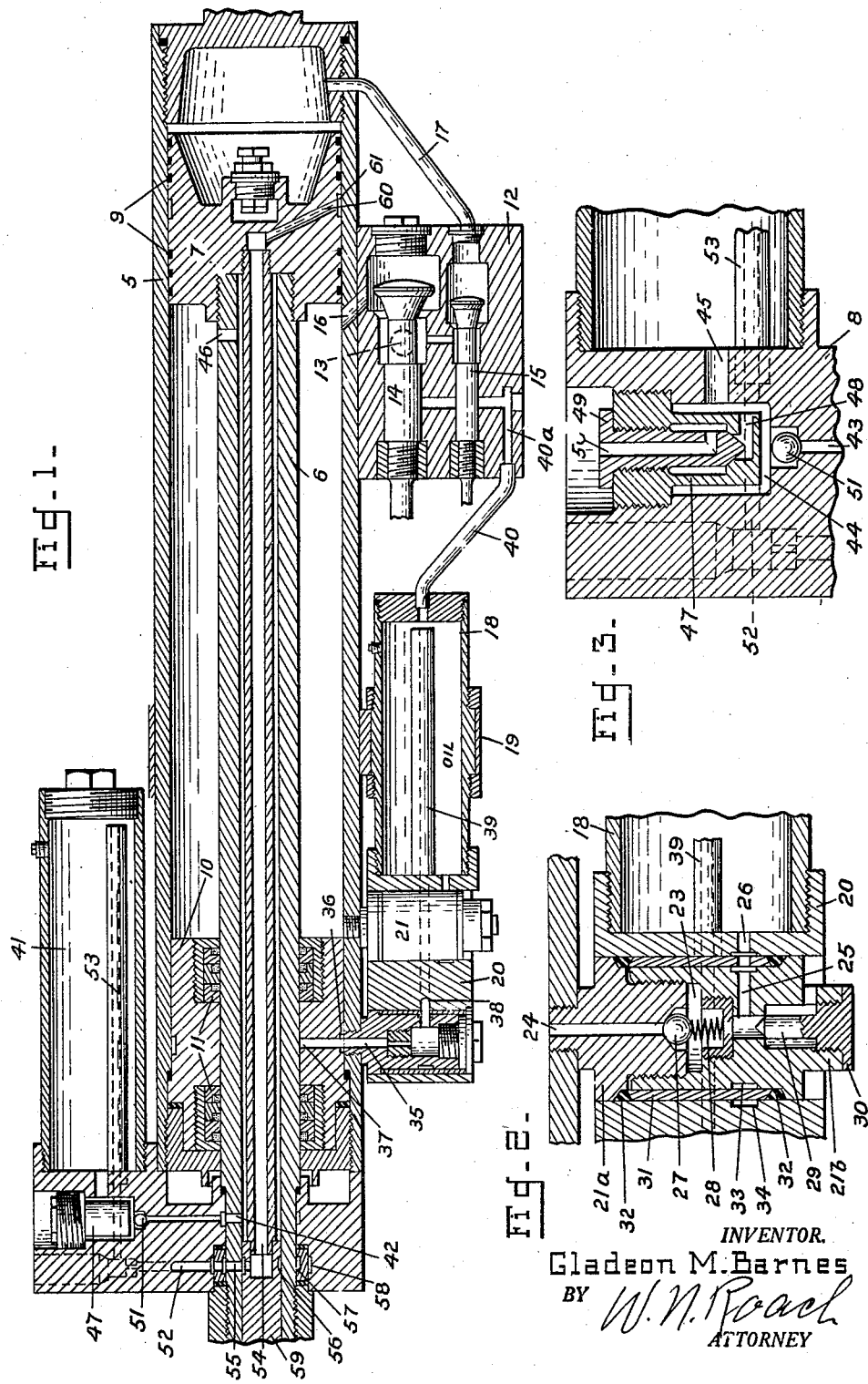
INVENTOR.
Gladeon M. Barnes
BY
*W. N. Roach*
ATTORNEY Patented May 26, 1931

1,806,884

UNITED STATES PATENT OFFICE

GLADEON M. BARNES, OF THE UNITED STATES ARMY, HASTINGS, MICHIGAN

CYLINDER AND PISTON

Application filed December 10, 1930. Serial No. 501,323.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to cylinders and pistons and more particularly it has reference to a system of supplying lubricant to the packed joints thereof.

The purpose of the invention is to employ a gaseous medium compressed by a piston for forcing a lubricant to the joints of the cylinder and piston structure with a view to lubricating the moving parts and establishing fluid seals where necessary to prevent leakage of the pressure medium.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a longitudinal sectional view of a cylinder and piston constructed in accordance with the invention;

Figs. 2 and 3 are enlarged detail sectional views through the valve mechanisms.

Referring to the drawings by characters of reference:

There is shown a cylinder 5 which in the application of the invention to a recoil and counter-recoil mechanism for guns, is attached to the movable gun barrel. Within the cylinder is a piston having a hollow piston rod 6 secured at one end to the piston head 7 and at the other to a stationary block 8 which in the case of a gun is the cradle. The piston head is provided with spaced sets of packing members 9—9 and the cylinder head 10 through which the piston rod passes is likewise provided with spaced sets of packing members 11—11.

A valve block 12 secured to the cradle is provided with an inlet 13 for a pressure medium and carries valves 14 and 15, the former controlling the introduction of the pressure medium through the port 16 to the cylinder in front of the piston head and the latter controlling the introduction of the pressure medium through the conduit 17 to the cylinder in rear of the piston head.

A cylinder 18 secured to the cylinder 5 by means of a hanger 19 constitutes a reservoir for holding a lubricant. In the forward elongated head 20 of the cylinder 18 there are placed two transversely disposed spaced casings 21 and 22 threadedly secured to the cylinder 5.

The casing 21 (see Fig. 2) is formed of two threadedly connected parts 21a and 21b providing a central chamber 23. A passage 24 in part 21a and a passage 25 in the part 21b leading to a port 26 in the head 20 establish communication between the cylinders 5 and 18 and enable the pressure medium to be admitted to the lubricant cylinder 18. A ball valve 27 in the chamber 23 is normally urged by its spring 28 to close the passage 24. A vent passage 29 leading from the passage 25 to atmosphere may be closed by a needle valve 30.

A sleeve 31 fitting in a reduced portion of the casing 21 abuts against a resilient packing ring 32 at each end. The packing rings are placed under compression when threadedly connecting the parts 21a and 21b and prevent leakage of the pressure medium passing through the casing. An annular groove 33 in the part 21b and a groove 34 in the head 20 encircling the sleeve 31 are in communication with the passage 25 and the port 26. Both of the grooves are normally filled with lubricant from the cylinder 18 and provide a fluid seal.

The casing 22 (see Fig. 1) is similar to the casing 21 but is not equipped with valves. A passage 35 in this casing connects with a peripheral groove 36 and a passage 37 in the cylinder head 10 and also with a passage 38 in the head 20 leading to a tube 39 disposed in the cylinder 18. The passage 37 is positioned between the packing members 11 and enables lubricant from the cylinder 18 to be supplied to the piston rod and form a fluid seal. Lubricant will likewise fill the peripheral groove 36 and form a fluid seal on the outside of the cylinder head 10.

A conduit 40 leads from the rear end of the cylinder 18 to the valve block 12 and supplies lubricant to the valves 14 and 15 by way of the passage 40a.

A second cylinder 41 for holding a lubricant is associated with the stationary elements, being supported by the block 8. This cylinder is in communication with the forward end of the hollow piston rod 6 by means of a port 42 in the rod, and a passage 43, chamber 44 and port 45 in the block 8. A second port 46 in the piston rod adjacent the piston head enables the pressure medium from the cylinder 5 to pass into the cylinder 41.

A thimble 47 disposed in the chamber 44 and having communication therewith through a port 48 carries a needle valve 49 whose stem is spaced from the wall of the thimble and provided with a vent 50. A ball valve 51 for closing the passage 43 is limited in movement by the thimble.

A passage 52 in the block 8 establishes communication between a tube 53 in the cylinder 41 and a tube 54 within the hollow piston rod, there being provided a port 55 in the piston rod. In order to facilitate connection of these passages they preferably terminate in peripheral grooves, the grooves 56, 57 and 58 being shown in the various parts and when filled with lubricant providing fluid seals where necessary.

The tube 54 is secured at one end in the piston head and supported at the other end in a retainer 59 so that it is held in spaced relation with respect to the hollow piston rod. The tube serves to supply lubricant to a passage 60 leading to a peripheral groove 61 formed in the piston head between the sets of packing 9—9.

In operation the relative movement of the cylinder and piston acts to compress a medium which is delivered to the cylinders 18 and 41 to place the lubricant in these cylinders under pressure and force it to various parts of the structure where it is utilized to lubricate and establish fluid seals for preventing leakage of the pressure medium. Where the pressure medium is one that will deposit carbon the lubricant will be available to prevent the carbon from adhering to the cylinder walls.

The pressure to be developed in the cylinders 15 and 41 may be controlled by respective adjustment of the valves 30 and 49.

I claim:

1. In combination with a cylinder and piston, a valved gas inlet for the cylinder, a liquid reservoir carried by the cylinder, a liquid reservoir carried by the piston, a valved communication between the cylinder and its reservoir, a valved communication between the cylinder and the reservoir of the piston, a valved vent for each of the communications, a liquid passage leading from the reservoir of the cylinder to the piston rod and a liquid passage leading from the reservoir of the piston to the piston head.

2. In combination with a pair of relatively reciprocal members, a gas inlet for one of said members, a liquid reservoir associated with each of said members, means for admitting gas pressure to the reservoirs, and means for conducting liquid from the reservoirs to bearing surfaces of the reciprocal members.

3. A cylinder, a valved inlet for admitting a gaseous medium to the cylinder, a piston compressing the gaseous medium, a liquid reservoir associated with the cylinder, a pair of casings disposed in one end of the reservoir and attached to the cylinder, a valved communication in one of the casings for conducting the gaseous medium to the reservoir, a valved communication in the other casing for conducting liquid from the reservoir to the stuffing box of the cylinder, and means for conducting liquid from the reservoir to the valved inlet.

4. A cylinder, a valved inlet for admitting a gaseous medium to the cylinder, a piston compressing the gaseous medium, a liquid reservoir associated with the cylinder, a pair of casings disposed in one end of the reservoir and attached to the cylinder, a valved communication in one of the casings for conducting the gaseous medium to the reservoir, and a valved communication in the other casing for conducting liquid from the reservoir to the cylinder.

5. A cylinder, means for admitting a gaseous medium to the cylinder, a piston compressing the gaseous medium, a liquid reservoir associated with the cylinder, means for admitting the pressure medium to the reservoir, and means for conducting liquid from the reservoir to bearing surfaces of the cylinder.

6. A cylinder, means for admitting a gaseous medium to the cylinder, a piston having a hollow rod for compressing the gaseous medium, a liquid reservoir carried by the piston rod and having communication with the cylinder through the piston rod whereby the pressure medium is conducted to the reservoir, a tube within the piston rod and having communication with the exterior of the piston head and a liquid passage between the tube and the reservoir.

7. In combination with a cylinder and piston, means for admitting a gaseous medium to the cylinder, a lubricant reservoir associated with the cylinder and piston and having communication with movable and unsealed elements of the cylinder and piston, and means for admitting the gaseous medium to the reservoir to distribute the lubricant.

GLADEON M. BARNES.